United States Patent Office 3,562,768
Patented Feb. 9, 1971

3,562,768
PROCESS FOR PRODUCING FINELY SUBDIVIDED
ALKALI METAL POLYPHOSPHATE
Richard Courtney Edquist, Melbourne, Victoria, Australia, and Richard Mark Orpen Maunsell, Toronto, Ontario, Canada, assignors to Electric Reduction Company of Canada Ltd., Toronto, Islington, Ontario, Canada, a Canadian company
Filed Nov. 22, 1966, Ser. No. 598,145
Claims priority, application Australia, Nov. 22, 1965, 66,816/65
Int. Cl. C01b 25/30, 25/38
U.S. Cl. 23—107                                              11 Claims

ABSTRACT OF THE DISCLOSURE

The invention provides a process for removing water from aqueous solutions of solids, in particular from heat sensitive solids, by causing such a solution to flow into a fast moving stream of combustion products. The invention is of particular use in controlling temperature sensitive reactions occurring in the solids being dried, which is of especial importance in the production of condensed alkali metal phosphates from orthophosphate liquor.

---

Figure 1:
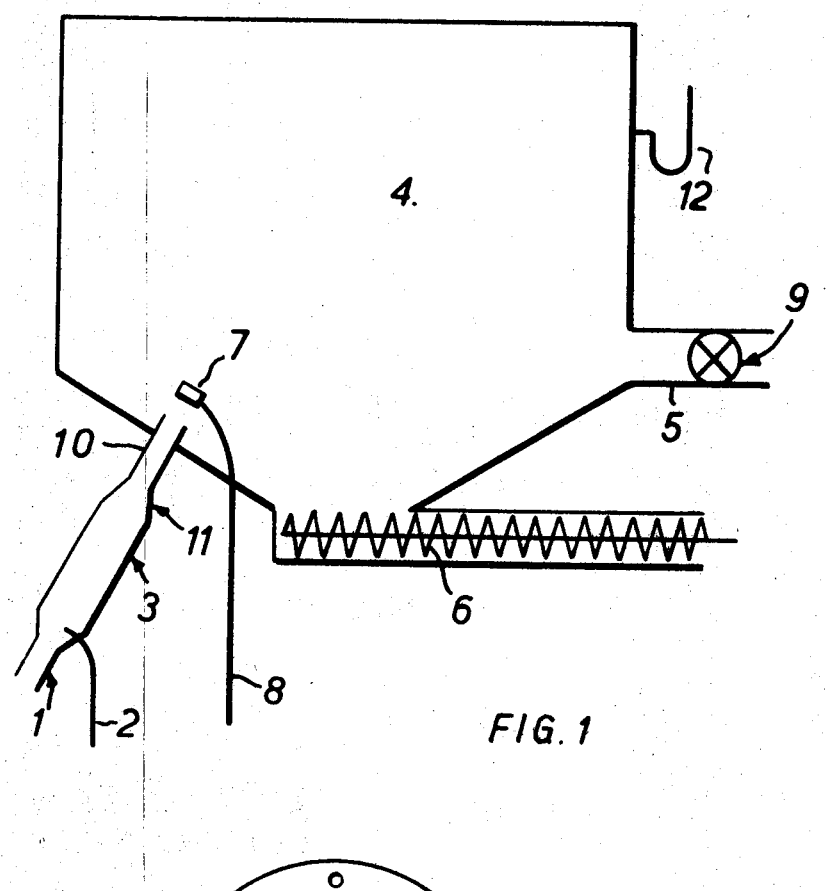
Figure 2:
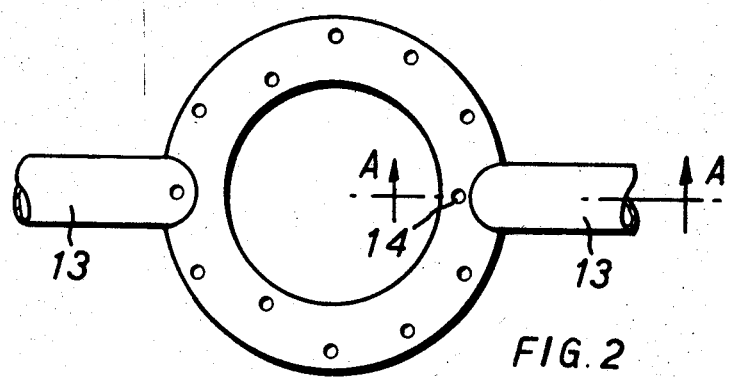
Figure 3:
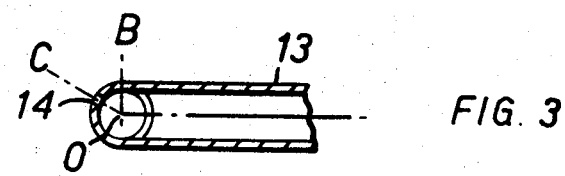

The invention relates to a method of drying aqueous solutions of solids which are sensitive to temperature or which require close temperature control in order to obtain the product in a tractable form.

One method of doing this has been by spray drying in which the solution to be dried is atomised by a spray nozzle in a heated tower. This method has been, and still, is conventionally used for drying organic materials, such as food extracts, where the drying temperature is comparatively low, say aronud 100° C. It has also been used for solids for which a higher drying temperature can be used, for example alkali metal phosphates, and in such cases the solution is sprayed into the flame produced, for example, by a ring burner. An alternative method, which is especially applicable at the higher temperatures is drum drying and this is the conventional method for drying orthophosphate liquor.

We have now found, however, that if an aqueous solution of a solid is caused to flow into a stream of gaseous combustion products flowing at a high velocity of, say, at least 300 ft./sec. the fine droplets which are formed will mix intimately with the gases thereby effecting the evaporation of the water from the droplets and causing a rapid drop in the temperature of the gases until an equilibrium is reached and hence producing a solid which has been subject to temperatures higher than the equilibrium for an extremely short period only. Such a process therefore makes it possible to control temperature-sensitive physical and chemical reactions which may occur in the solid being dried so as, for example, to prevent deterioration of the product or the formation of the latter in a sticky or intractable form.

The present invention provides, from one aspect, a method of removing water from aqueous solutions of solids, which comprises causing the solution to be dried to flow into a fast moving stream of combustion products within, or emerging from, a tube into which they flow directly from a burner.

From a second aspect the invention provides the apparatus hereinafter described for performing the process of the invention.

In the process of the invention the solution is atomised in and by the stream of combustion products. This is in contradistinction to spray driers, in which the solution is atomised by a spray nozzle into a mass of hot gas which has little or no velocity past the inlet nozzle for the liquid. Atomisation in and by a fast-moving stream of combustion products has two important inter-connected results, namely (1) a finer spray is produced than can generally be obtained with a spray nozzle and (2) the resulting droplets are very efficiently mixed with the gas so that a rapid drop in temperature due to the evaporation of water takes place until an equilibrium temperature is reached and so the solid material is subject to a temperature higher than equilibrium only for an extremely short time.

The speed of flow of the combustion products at the point where the liquid feed is introduced should be greater than 300 ft./sec. There is no upper limit to the speed. In order to achieve combustion product flow rates of this order it is necessary to accelerate the gases from the point of combustion by a considerable factor, as the velocity at which a stable flame can be maintained is usually of the order of 10 ft./sec. or less. To obtain velocities greater than 300 ft./sec. we cause the gases to flow, after combustion has taken place, directly into a tube in which they accelerate to the required velocity.

Ideally the size of the droplets should be such that the water is not all evaporated from them before they reach the region of temperature equilibrium. The droplet size is mainly determined by the gas velocity, and a suitable velocity where the temperature of the burner gases is about 1600° C. (produced by burning a hydrocarbon fuel in the stoichiometric amount of air) is in the range 850 to 1100 ft./sec. The droplet size should be as uniform as possible and this can be achieved by careful design of the tube and liquid feed system. If there is a considerable spread of droplet sizes and the solid is heat-sensitive, the variable must be adjusted so that the water from the smaller drops is not all evaporated before the equilibrium region is reached.

The solid particles leave the vicinity of the tube at a high velocity and must be collected. It is normally convenient to fit the tube into the wall of a chamber such as a tower so that an atmosphere is created which is substantially at the equilibrium temperature resulting from the cooling of the combustion gases by the evaporation of water. This enables the final stages of the drying to be completed during the trajectory of the particles through the tower. It also enables the solid to be subjected to a heat treatment, for example the conversion of orthophosphate to a polyphosphate, as described below.

An advantage of the invention is that it enables control of the process to be effected by regulating the rate of liquid feed and rate of fuel consumed, without varying the temperature of the combustion gases. The most efficient way of using the fuel is to evaporate the water at the highest possible temperature, i.e. the temperature of combustion of the comburants in stoichiometric proportions. This is possible in the process of the invention, even with a solid that has to be dried at a comparatively low temperature, owing to the fact mentioned above that the combustion gases are cooled very rapidly to the equilibrium temperature. The latter is determined by the ratio of the water to be evaporated to the heat input. Thus, for a given throughput of solid the equilibrium temperature can be controlled by varying the concentration of the aqueous solution, diluting the cobustion gases, or varying the ratio of fuel consumed to solution fed, or a combination of these factors, although it will be understood that dilution of either the solution or the gases leads to a loss of thermal efficiency. While the maximum thermal efficiency is obtained by using the comburants in stoichiometric proportions without any diluent it will normally be most economical to burn the fuel with air. If the fuel is a hydrocarbon, as will usually be the case, the resulting combustion temperature will be 1600° C., which is suitable for most operations.

The invention may be used for drying a number of solid materials in aqueous solution, for example foodstuffs and detergents which are heat-sensitive and alkali metal phosphates which are liable to give trouble owing to their tendency to form sticky deposits.

In order to produce alkali metal orthophosphates in solid form from so-called ortho-liquor, the equilibrium temperature is kept below that at which molecular dehydration to form condensed phosphates occurs.

As mentioned above, the invention can advantageously be applied to the drying of solids to which a heat treatment is to be applied, provided this treatment is such that it can be carried out at the equilbrium temperature. Of particular importance is the production of condensed alkali metal phosphates from ortho-liquor, particularly sodium tripolyphosphate, although other condensed phosphates such as tetrasodium pyrophosphate can be obtained in this way. The conversion from ortho- to condensed phosphate will normally take place wholly or mainly during the trajectory of the particles through the collecting tower; although part of this trajectory may be occupied by the completion of the drying of the orthophosphate.

In order to make alkali metal, especially sodium, tripolyphosphate an aqueous solution of a mixture of sodium orthophosphates of the correct Na:P ratio is introduced into the stream of combustion products. The equilibrium temperature achieved after evaporation of the solvent water, or the bulk of it, is adjusted in the way described above to a value in the range of 350° C. to 500° C., preferably 350° C. to 430° C. In this range, and if there is a sufficient gas velocity, there is substantially complete conversion to tripolyphosphate in the conditions obtaining in the process of the invention. The choice of temperature within the stated range depends on the ratio of the Phase I to the Phase II form of tripolyphosphate required for the product. The Phase I/Phase II temperature relationships are rather complicated. Phase I is formed as a metastable intermediate which changes quickly to Phase II. Then, at sufficiently high temperatures, the Phase II converts to Phase I. If, in the present process, the conditions are such that there has been substantially complete conversion to tripoloyphosphate while the particles are in flight, we find that the higher the equilibrium temperature the greater the proportion of the Phase I form. Thus if a proportion of Phase I is required, not only must the temperature be high enough for the requisite conversion, but also this conversion must take place during the residence of the tripolyphosphate in the tower. The solid particles collect in the bottom of the tower and their residence time in this location can be as long as desired. It is, however, desirable for economic reasons to reduce the residence time as much as possible and this is assisted by the presence of water vapour in the tower which acts as a catalyst for the conversion to tripolyphosphate and accelerates the Phase I to Phase II conversion and vice versa. The partial pressure of water vapour may be controlled by sucking air into the tower, preferably pre-heated by contact with the burner tube. For this purpose the tower is maintained under a small suction, for example of 0.2–0.3 inch of water.

If the conditions are such that there has been poor conversion of the orthophosphate to tripolyphosphate (e.g. less than 90%) owing, for example, to the formation of large liquid droplets which take longer to dry and may diverge from the high-velocity gas stream, the relationship of temperature to the Phase I/Phase II ratio is reversed, lower temperatures now giving the greater proportion of Phase I. To increase the proportion of tripolyphosphate and of the Phase II form in these circumstances, the solid is collected in the tower and allowed to dwell there for the necessary time. If, on the other hand, there has been good conversion to tripolyphosphate while the particles are in flight, it is generally unnecessary for the solid to dwell in the tower when producing the proportions of Phase I material normally required in commerce.

In processes involving the drying and dehydrating of phosphates, the formation of sticky deposits must be avoided. For this reason the trajectory of the solid particles through the tower must be long enough to ensure that the particles are non-sticky before they impinge on the walls or on any solid collected in the bottom. We have found that with a gas velocity of 1000 ft./sec. there should be about 25–30 ft. of travel before the particles hit the wall. Moreover, the form of the jet or jets through which the liquor is introduced into the stream of combustion gas must be symmetrical with respect to the axis of the tube to prevent formation of deposits in the latter. It is preferred to use a ring of jets coaxial with the tube which deliver the spray into the interior of the gas stream.

For ease of construction and maintenance, the liquid feed may be located just downstream of the gas tube, but care must be taken to ensure that the paths of the droplets are not markedly divergent, since otherwise they will leave the hot gas stream before the equilibrium region is reached.

The invention includes appartus for carrying out the method described above, which comprises a collecting chamber, a tube of which the outlet end opens into the collecting chamber and the inlet end opens into a combustion chamber, means for supplying coburants to the combustion chamber, and a jet or jets for introducing an aqueous solution into the tube or into the stream of com bustion gases emerging, in operation, from the outlet end of the combustion gases emerging, in operation, from the outlet end of the tube.

In order to minimise the pressure loss when the combustion products flow through the tube, the latter may be arranged so as to form the throat of a Venturi. Either the inlet or the outlet tapering section of the Venturi, or both, may, however, be omitted and we have found it convenient for constructional reasons to omit the outlet tapering section.

Apparatus according to the invention is shown by way of example in the accompanying drawings in which FIG. I is a diagrammatic vertical cross-section. The apparatus comprises an air inlet 1 and a fuel oil inlet 2 at the base of a combustion chamber 3, from which the products of combustion may enter directly into a tube 10 via a Venturi section 11. The outlet end of tube 10 is situated in a collecting tower 4. Near the outlet end of the tube 10 there is a radial spray 7, co-axial with the tube 10, which is connected to a liquid feed pipe 8. This spray is shown in detail in FIGS. II and III in which FIG. II is an elevation view of the spray and FIG. III is a vertical cross-section view along AA. The spray comprises a circular tube having two feed pipes 13 connected to it in positions which are diametrically opposite. Into the tube are bored 12 holes at 45° to the axis of the spray, 3 of these holes are being inclined inwards towards the axis and the other 9 being inclined outwards from the axis, thus FIG. III shows an inward pointing hole or jet 14, having the angle BOC as 45°. FIG. II shows the grouping of these holes, having 3 outward-pointing jets adjacent to each other and then one inward-pointing jet; the angle subtended at the centre by any pair of adjacent jets being 30°. The tower 4 has an exit duct 5 for gaseous effluent at the end of which is situated an extractor fan 9; the base of the tower is fitted with a screw conveyor for removing solid products from the tower. The tower is further equipped with a manometer 12.

The process of the invention is illustrated by the following examples.

EXAMPLE 1

Tetrasodium pyrophosphate was prepared by feeding an aqueous solution of disodium monohydrogen orthophosphate into combustion gases prepared by burning 68 gallons per hour of fuel oil in 2,000 cubic feet per minute of air. The speed of the gas was 720 feet per second at the point where the liquid orthophosphate solution was introduced. The temperature in the conversion tower was maintained at 350° C. by controlling the feed rate of the disodium orthophosphate solution (107° Twaddell at 78° C.) at 2.0 tons per hour.

This procedure made tetrasoduim pyrophosphate with less than 0.5% disodium orthophosphate impurity.

EXAMPLE 2

Sodium tripolyphosphate was prepared by feeding an aqueous solution of sodium orthophophates having an Na:P ratio of 5:3 into combustion gases having a velocity of 900 ft./sec. 75 gallons per hour of fuel oil were burned in air flowing at 2,800 cubic feet per minute in order to provide the combustion gases. The orthophosphate solution (116° Twaddell at 78° C.) was fed at a rate of 2.3 tons per hour so that the temperature of the gases in the conversion tower was maintained at 400° C.

The sodium tripolyphosphate produced by this process had an $Na_5P_3O_{10}$ content of 95% minimum and a temperature rise of 13° C.

EXAMPLE 3

In the process of Example 2 the feed rate of sodium orthophosphates was reduced so that the temperature of the gases in the conversion tower increased to 440° C.

The sodium tripolyphosphate produced in this manner had a temperature rise of 19.5° C.

EXAMPLE 4

The product collected in the base of the conversion tower in Examples 2 and 3 normally has a bulk density of about 0.65 gm. per cubic centimetre. A product having a higher bulk density was prepared by grinding in a suitable mill. A van Gelder mill was used for this purpose and a product with a bulk density of 1.0 to 1.1 gm. per cubic centimeter was prepared.

EXAMPLE 5

Sodium tripolyphosphate with a reduced bulk density was prepared by lowering the velocity of the combustion gases. The reduction in the velocity was achieved by increasing the diameter of the tube through which the gases pass, so that the gas velocity decreased from 650 ft./sec. to 500 ft./sec., whilst keeping a constant volume of combustion gases, the composition and rate of feeding the sodium orthophosphate solution being kept constant. The bulk density was reduced from 0.60 g./cc. to 0.42 g./cc.

EXAMPLE 6

In a trial run for the production of potassium pyrophosphate the following conditions were established:

Oil to burner—35 gals./hr.
Air to tower inlet—1700 c.f.m.
Temperature at burner exit—1500° C.
Temperature at tower top—425° C.
Temperature at tower centre—410° C.
Temperature of feed solution—50° C.
Flow to spray—1.5 tons/hour
Spray inlet—22 lbs./sq. inch
Tower pressure—0.2″ water gauge
Air to blower—1.5 lbs./sq. inch
Density of feed solution—15.8 lbs./gal.

The potassium pyrophosphate obtained analysed as follows:

Orthophosphate—below 0.3%
Insoluble—nil
pH of 1% solution—10.1
Density—22 lbs./ft.$^3$
Colour—white

EXAMPLE 7

In a trial run for the production of potassium tripolyphosphate with roughly the same conditions as above, the following product was obtained:

Potassium tripolyphosphate—89%
Potassium pyrophosphate—5%
Potassium orthophosphate—3%
Tri-meta-phosphate—nil
Insoluble meta-phosphate—nil
Appearance—white, free flowing
Solution—scarcely detectable turbidity
Bulk density—45 lbs./ft.$^3$ Although the products of Examples 6 and 7 are normally highly hygroscopic, by proceeding in accordance with the invention, dry, free-flowing products were obtained.

What is claimed is:

1. In a process for producing finely subdivided solid alkali metal polyphosphate by contacting an aqueous solution of an alkali metal orthophosphate with a hot gas stream whereby water is removed and said alkali metal orthophosphate undergoes molecular dehydration while drying to form an alkali metal polyphosphate, the improvement which consists of utilizing as said hot gas stream, a stream of hot combustion gases at a temperature of at least 1500° C. flowing at a velocity of at least 300 feet per second through a tube into which they flow directly from a burner, and introducing said aqueous solution into said gas stream at a temperature of at least 1500° C. within said tube or as the said gases emerge from said tube, in a direction that has a component of velocity parallel to that of said stream of hot combustion gases.

2. The process of claim 1 wherein said hot combustion gases flow at a velocity between about 850 and 1100 feet per second.

3. The process of claim 2 wherein said tube is shaped to cause said hot gases flowing through said tube to accelerate as a result of a venturi effect.

4. The process of claim 3 wherein said hot combustion gases are formed by burning a hydrocarbon in air.

5. The process of claim 3 wherein the said hot gases flow through said tube into a collecting chamber wherein said finely subdivided solid materials are collected, and wherein said collecting chamber is only heated by said stream of hot gases emerging from said tube.

6. The process of claim 5 wherein said collecting chamber is sufficiently large that there is at least 25 feet of unimpeded travel in said chamber from the point of introduction of said aqueous solution into said gas stream.

7. The process of claim 5 wherein the temperature within said collecting chamber is between about 350° C. and 500° C.

8. The process of claim 5 wherein said alkali metal orthophosphate is sodium orthophosphate and wherein said sodium orthophosphate undergoes molecular dehydration while drying to form sodium tripolyphosphate.

9. The process of claim 8 wherein the ratio of Phase I to Phase II sodium tripolyphosphate in the product is controlled by controlling the partial pressure of the water vapor in the collected chamber.

10. The process of claim 1 wherein said alkali metal orthophosphate undergoes molecular dehydration while drying to form the alkali metal tripolyphosphate.

11. The process of claim 10 wherein said alkali metal is sodium.

References Cited

UNITED STATES PATENTS

| | | | |
|---|---|---|---|
| 2,287,995 | 6/1942 | Haugh | 159—4 |
| 2,887,390 | 5/1959 | Coulter et al. | 99—199 |
| 2,155,119 | 4/1939 | Ebner | 23—1 |
| 2,977,317 | 3/1961 | Rodis et al. | 252—135 |
| 3,023,083 | 2/1962 | Rodis et al. | 23—107 |

OSCAR R. VERTIZ, Primary Examiner

G. A. HELLER, Assistant Examiner

U.S. Cl. X.R.

23—1; 159—4, 48